United States Patent
Prevot et al.

(10) Patent No.: US 11,066,973 B2
(45) Date of Patent: Jul. 20, 2021

(54) HEATING SYSTEM FOR A TANK HEADER OF AFTERTREATMENT SYSTEM AND METHOD OF HEATING A TANK HEADER

(71) Applicant: Cummins Emission Solutions Inc., Columbus, IN (US)

(72) Inventors: Orlando Dwayne Prevot, Columbus, IN (US); Arulkumaran Muthukumarasamy, Greenwood, IN (US); Nicholas Ray Lewis, Columbus, IN (US); Vaibhav J. Lawand, Greenwood, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 74 days.

(21) Appl. No.: 16/031,190

(22) Filed: Jul. 10, 2018

(65) Prior Publication Data

US 2020/0018208 A1     Jan. 16, 2020

(51) Int. Cl.
*F01N 3/20*     (2006.01)
*F01N 3/28*     (2006.01)
*F01N 9/00*     (2006.01)

(52) U.S. Cl.
CPC .......... *F01N 3/208* (2013.01); *F01N 3/2896* (2013.01); *F01N 9/005* (2013.01); *F01N 2610/02* (2013.01); *F01N 2610/105* (2013.01); *F01N 2900/0601* (2013.01); *F01N 2900/12* (2013.01); *F01N 2900/1811* (2013.01)

(58) Field of Classification Search
CPC ............. F01N 2610/02; F01N 2610/10; F01N 2610/1406; F01N 2900/1806; F01N 2900/1811; F01N 2240/02
See application file for complete search history.

(56) References Cited

U.S. PATENT DOCUMENTS

| 2,474,401 A | 6/1949 | Mustee |
| 2009/0078692 A1* | 3/2009 | Starck .................. F01N 3/2066 219/260 |
| 2012/0160934 A1 | 6/2012 | Ponnathpu |
| 2014/0325965 A1* | 11/2014 | Tuken ..................... F01N 3/208 60/286 |
| 2016/0356193 A1 | 12/2016 | Rodatz et al. |
| 2018/0149059 A1 | 5/2018 | Froberg et al. |

FOREIGN PATENT DOCUMENTS

| EP | 1 985 908 A1 | 10/2008 |
| EP | 2 876 272 A1 | 5/2015 |
| WO | WO-2019/070130 A1 | 4/2019 |

OTHER PUBLICATIONS

International Search Report & Written Opinion in PCT/US2019/040941, dated Sep. 24, 2019, 9 pages.

* cited by examiner

*Primary Examiner* — Anthony Ayala Delgado
(74) *Attorney, Agent, or Firm* — Foley & Lardner LLP

(57) ABSTRACT

A system comprises a tank header configured to couple to a reductant tank and a heating mechanism positioned proximate to the tank header. The heating mechanism is configured to heat at least a portion of the tank header. The system may further comprise a conduit configured to pass reductant from the reductant tank and a junction configured to receive reductant from the reductant tank.

28 Claims, 3 Drawing Sheets

HEATING SYSTEM FOR A TANK HEADER OF AFTERTREATMENT SYSTEM AND METHOD OF HEATING A TANK HEADER

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia or urea, is typically introduced into the exhaust gas flow prior to the catalyst chamber. To introduce the reductant into the exhaust gas flow for the SCR process, an SCR system may dose or otherwise introduce the reductant through an injector that vaporizes or sprays the reductant through a nozzle into an exhaust pipe of the exhaust system up-stream of the catalyst chamber. The SCR system may include one or more sensors to monitor conditions within the exhaust system.

SUMMARY

Implementations described herein relate to temperature estimation and heating of a component, such as a tank header, of a system of an internal combustion engine. One implementation relates to a system comprising a tank header and a heating mechanism. The tank header is configured to couple to a reductant tank. The heating mechanism is positioned proximate to the tank header and is configured to heat at least a portion of the tank header. In some implementations, the tank header comprises a conduit configured to pass reductant from the reductant tank and a junction configured to receive reductant from the reductant tank. In some implementations, the system further comprises a dosing pump module configured to provide the reductant from the reductant tank to the conduit. In some implementations the system further comprises a sensor thermally coupled to the tank header.

In some implementations, the system further comprises a controller. The controller is configured to execute a process comprising accessing a parameter, calculating a temperature of the tank header using the parameter, comparing the calculated temperature to a threshold temperature, and activating the heating mechanism to heat the at least the portion of the tank header responsive to comparing the calculated temperature to the threshold temperature. In some implementations, the controller is further configured to execute a process that comprises accessing a parameter indicative of reductant flow through the tank header, wherein calculating the temperature of the tank header comprises using a thermal model to estimate the temperature of the tank header using the parameter indicative of reductant flow through the tank header. In some implementations, the controller is further configured to execute a process that comprises accessing a parameter indicative of ambient air temperature or ambient air velocity, wherein calculating the temperature of the tank header comprises using a thermal model to estimate the temperature of the tank header using the parameter indicative of ambient air temperature or ambient air velocity. In some implementations, the controller is further configured to execute a process that comprises determining the calculated temperature is at or above the threshold temperature and deactivating the controlled heating process for the tank header responsive to determining the calculated temperature is at or above the threshold temperature.

Another implementation relates to a method for controlled heating of a tank header. The method comprises accessing a parameter, calculating, by a controller, a temperature of the tank header using the parameter, comparing, by the controller, the calculated temperature to a threshold temperature, and activating a controlled heating process for the tank header responsive to comparing the calculated temperature to the threshold temperature. The controlled heating process comprises activating a heater to heat the tank header. In some implementations, the method further comprises accessing a parameter indicative of reductant flow through the tank header, wherein calculating the temperature of the tank header comprises using a thermal model to estimate the temperature of the tank header using the parameter indicative of reductant flow through the tank header. In some implementations, the method further comprises accessing a parameter indicative of ambient air temperature, wherein calculating the temperature of the tank header comprises using a thermal model to estimate the temperature of the tank header using the parameter indicative of ambient air temperature. In some implementations, the method further comprises accessing a parameter indicative of ambient air velocity, wherein calculating the temperature of the tank header comprises using a thermal model to estimate the temperature of the tank header using the parameter indicative of ambient air velocity. In some implementations, the method further comprises determining the calculated temperature is at or above the threshold temperature and deactivating the controlled heating process for the tank header responsive to determining the calculated temperature is at or above the threshold temperature.

In some implementations, calculating the temperature of the tank header comprises using a value obtained from a sensor thermally coupled to the tank header. In some implementations, activating the controlled heating process for the tank header responsive to comparing the calculated temperature to the threshold temperature comprises determining the calculated temperature is below the threshold temperature. In some implementations, the controlled heating process utilizes inductive heating, wherein a heater is inductively coupled to a metal plate of the tank header. In some implementations, the controlled heating process utilizes a heat pump, wherein the heat pump transfers heat from another component of the system. In some implementations, activating the controlled heating process for the tank header responsive to comparing the calculated temperature to the threshold temperature comprises determining the calculated temperature is below the threshold temperature. In some implementations, the heating mechanism is a resistive heating coil, an inductive heater, or a heat pump.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for reductant dosing. More particularly, the present disclosure describes heating a tank header coupled to a reductant tank. A tank header may be a cap or other component that closes an opening in the reductant storage tank through which a reductant delivery conduit, or other components (e.g., reductant quality sensor, reductant level sensor, temperature sensor, heating element, etc.), may be routed. Various heating strategies can be implemented for heating the tank header as well as heating additional components of an aftertreatment system. The heating of the tank header as well as the heating of additional components of an aftertreatment system may be implemented by a controller to control heating elements during operation. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some implementations of an aftertreatment system, a dosing pump module may be implemented to pump reductant from a reductant storage tank using a tank header coupled to the reductant storage tank to an injector. A tank header may be a cap or other component that closes an opening in the reductant storage tank through which a reductant delivery conduit, or other components (e.g., reductant quality sensor, reductant level sensor, temperature sensor, heating element, etc.), may be routed. The reductant delivery system can utilize heat strategies to portions of the system, including the tank header, to assist the system in cold ambient conditions.

II. Overview of Aftertreatment System

Figure 1:
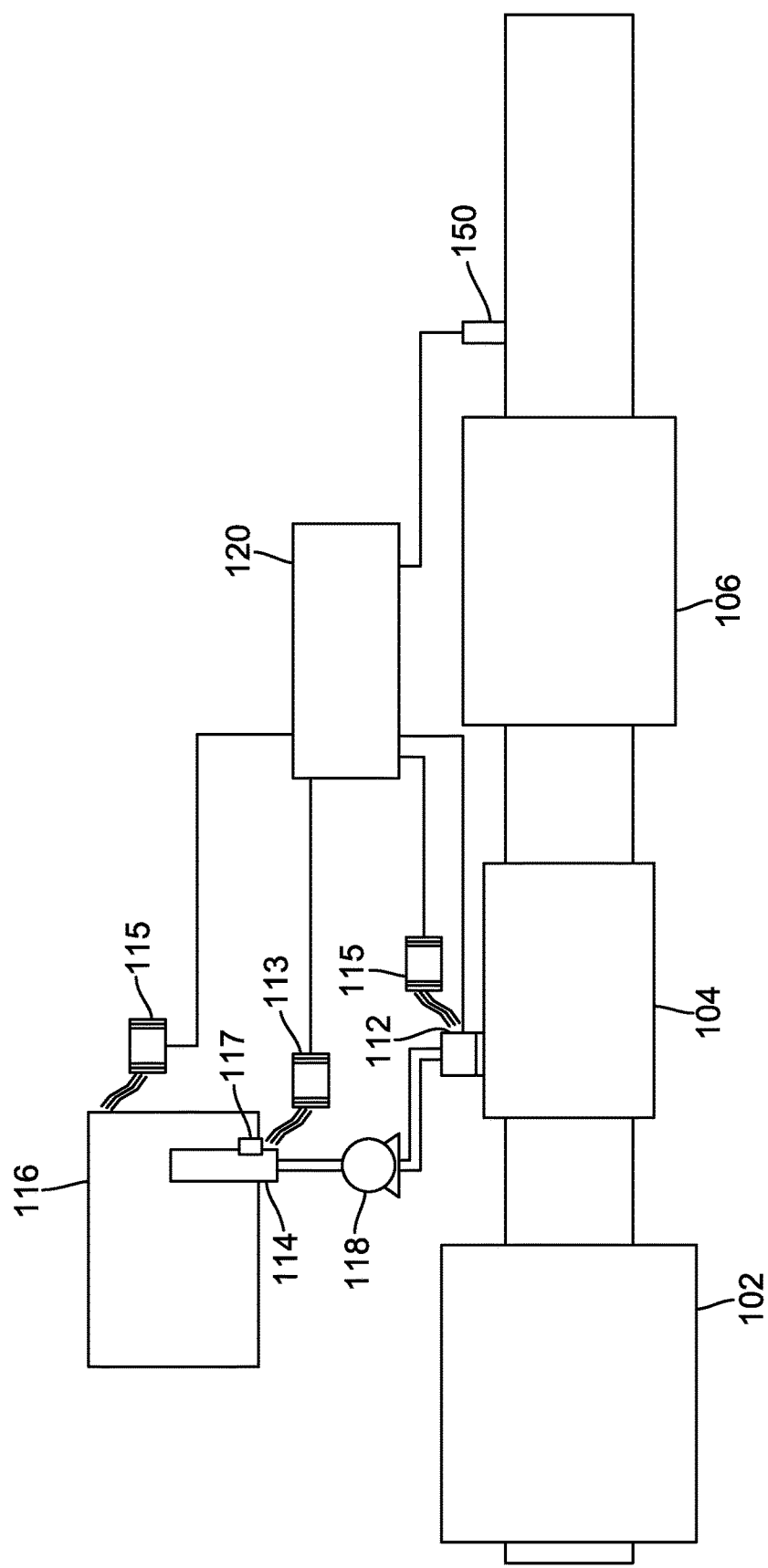
FIG. 1 is a block schematic diagram of an example selective catalytic reduction system having an example reductant delivery system for an exhaust system.

FIG. 1 depicts an embodiment of an aftertreatment system for an exhaust system. The aftertreatment system may include a particulate filter, for example a diesel particulate filter (DPF) 102, a reactor pipe or decomposition chamber 104, a SCR catalyst 106, and a sensor 150.

The DPF 102 is configured to remove particulate matter, such as soot, from exhaust gas flowing in the exhaust system. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. A reductant delivery system can be provided to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The reductant delivery system may include one or more reductant tanks 116 structured to store a reductant and fluidly coupled to an injector 112 mounted to the decomposition chamber 104, such that the injector 112 may dose the reductant into the exhaust gases flowing in the exhaust system. In some implementations, the reductant delivery system may include a pump module 118 to pressurize the reductant from the reductant tank 116 for delivery to the injector 112. The reductant tank 116 may include a tank header 114 through which a reductant delivery conduit, or other components (e.g., reductant quality sensor, reductant level sensor, temperature sensor, heating element, etc.), may be routed. The reductant tank 116 can be in fluid communication with the pump module 118 via the tank header 114 at a pump inlet and the injector 112 is in fluid communication with the pump module 118 at a pump outlet. In some implementations, the injector 112 may include an outlet for a return line to be in fluid communication with the reductant tank 116. Thus, reductant can also be pumped from the reductant tank 116 and circulated through the injector 112 and back to the reductant tank 116 via the return line. In some implementations, the system may circulate reductant from the reductant tank 116, through the pump module 118, injector 112, and return line only when the injector 112 is not dosing reductant into the exhaust system. In other implementations, the system may also circulate reductant from the reductant tank 116, through the pump module 118, injector 112, and return line when the injector 112 is dosing reductant into the exhaust system.

Figure 2:
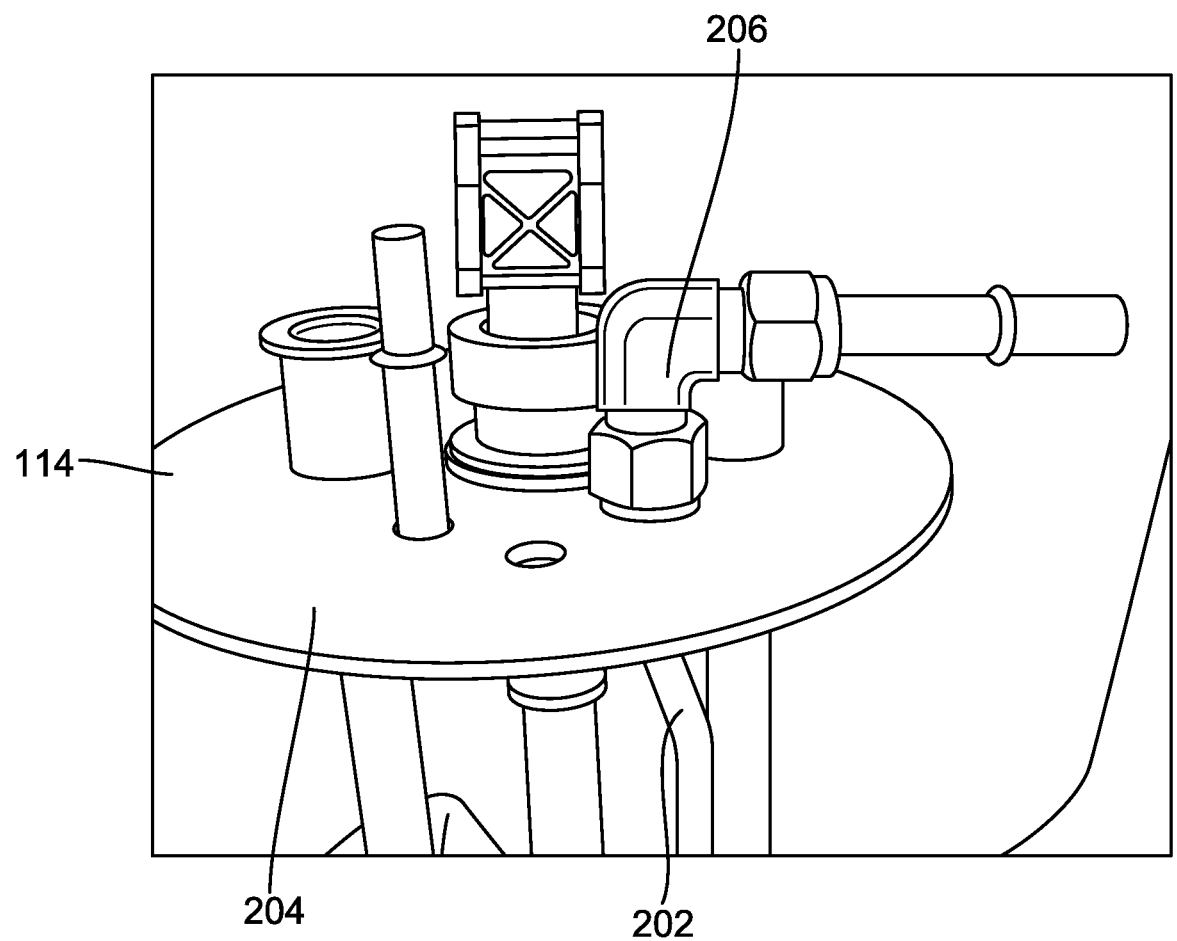
FIG. 2 is a graphic of an example reductant tank header for coupling to a reductant tank in a reductant delivery system for an exhaust system.

FIG. 2 depicts an embodiment of the reductant tank header 114. A reductant delivery conduit 202 is positioned through a reductant tank cap 204 (i.e., positioned through an opening defined in the reductant tank cap 204). A reductant delivery conduit connector 206 may be coupled to an end of the reductant delivery conduit 202. The reductant delivery conduit connector 206 is positioned outside the reductant storage tank (e.g., the reductant tank 116) to which the reductant tank header 114 is coupled.

The reductant is formulated to facilitate decomposition of the constituents of the exhaust gas (e.g., $NO_x$ gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLU®). For example, the reductant may comprise an aqueous urea solution having a particular ratio of urea to water. In particular embodiments, the reductant can comprise an aqueous urea solution including 32.5 w/w % of urea and 67.5 w/w % of deionized water, or including 40 w/w % of urea and 60 w/w % of deionized water, or any other suitable ratio of urea to deionized water. The aqueous nature of the reductant may cause it to freeze at low temperatures, for example, less than −11 degrees Celsius.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant is received and an outlet in fluid communication with an end of the exhaust system.

The exhaust system may further include an oxidation catalyst, for example a diesel oxidation catalyst (DOC), in fluid communication with the exhaust system (e.g., downstream of the SCR catalyst 106 or upstream of the DPF 102) to oxidize hydrocarbons and carbon monoxide in the exhaust gas.

In some implementations, the DPF 102 may be positioned downstream of the reactor pipe or decomposition chamber 104. For instance, the DPF 102 and the SCR catalyst 106 may be combined into a single unit, such as a DPF with SCR-coating (SDPF). In some implementations, the injector 112 may instead be positioned downstream of a turbocharger or upstream of a turbocharger.

The sensor 150 may be coupled to the exhaust system to detect a condition of the exhaust gas flowing through the exhaust system. In some implementations, the sensor 150 may have a portion disposed within the exhaust system, such as a tip of the sensor 150 may extend into a portion of the exhaust system. In other implementations, the sensor 150 may receive exhaust gas through another conduit, such as a sample pipe extending from the exhaust system. While the sensor 150 is depicted as positioned downstream of the SCR catalyst 106, it should be understood that the sensor 150 may be positioned at any other position of the exhaust system, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system.

III. Heating System

The aftertreatment system may include a heating system for heating one or more components of the reductant delivery system. For example, the heating system may include a heating mechanism 113 to provide heat or thermal energy to the tank header 114. In some implementations, the heating mechanism 113 is configured to be activated or deactivated responsive to a temperature comparison to threshold temperature value. In some implementations, if the calculated temperature is below the threshold temperature value, then the heating mechanism 113 is configured to activate. Activating or deactivating the heating mechanism 113 may include modifying a value for a control parameter, such as a 1 for activating the heating mechanism 113 and a 0 for deactivating the heating mechanism 113. Controlled heating processes used by the heating mechanism 113 may include one or more of using resistive heating coils, microwave energy, inductive heating, chemical reactions, a heat pump to transfer heat from a different part of the system, and the like.

The heating system also may comprise other heating mechanisms 115 to heat various other components of the system. For example, the heating mechanisms 115 may provide heat to the reductant tank 116 and/or the injector 112. In some implementations, one or more of the other heating mechanisms 115 use the same controlled heating process as heating mechanism 113. In some implementations, one or more of the other heating mechanisms 115 use a different controlled heating process.

IV. Control System

A controls system may be provided, e.g., in the form of one or more controllers 120, to control various aspects of the aftertreatment system. For example, the controller 120 can be electrically or communicatively coupled to the injector 112 and pump module 118 and configured to control the injector 112 and/or the pump module 118 to dose reductant into the decomposition chamber 104. The controller 120 can control operation of the pump module 118 to pump reductant from the reductant tank 116 via the pump inlet and deliver reductant to the injector 112 from the pump outlet at a desired flow rate using a pump frequency based on the linear relationship between flow rate and pump frequency. In some implementations the controller 120 may control an input voltage to the pump module 118 and/or injector 112 to control operation of the pump module 118 and/or injector 112. In other implementations, the controller 120 may include a data line to the pump module 118 and/or injector 112 such that a parameter value may be passed to the pump module 118 and/or injector 112 for internal control circuitry of the pump module 118 and/or injector 112 to control operation thereof. Based on a desired dosing rate (e.g., a flow rate of reductant through a nozzle of the injector 112 into the exhaust system to reduce exhaust emissions), the controller 120 can modify an input voltage and/or pump frequency command to the pump module 118 to achieve a desired flow rate out of the dosing pump module 118. In implementations where the system includes the return line and circulates reductant while dosing reductant from the injector 112, the flow rate from the outlet of the pump module 118 can be increased or decreased to maintain a system flow rate as the dosing rate changes. That is, for a desired dosing rate, a desired reductant recirculation flow rate, and a measured pump output pressure (i.e., the resistive pressure), a desired pump outlet flow rate can be calculated.

The controller 120 may also be configured to control one or more of the heating mechanisms 113, 115 to cause heat or thermal energy to be provided to one or more components of the aftertreatment system. For example, the controller 120 may be configured to control heating mechanisms 115 to provide heat to the reductant tank 116 and/or the injector 112. The controller 120 also may be configured to control heating mechanism 113 to provide heat to the tank header 114. The controller 120 may also be configured to receive temperature readings from one or more temperatures sensors (e.g., temperature sensor 117 coupled to tank header 114) coupled to various components of the aftertreatment system.

The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

Figure 3:
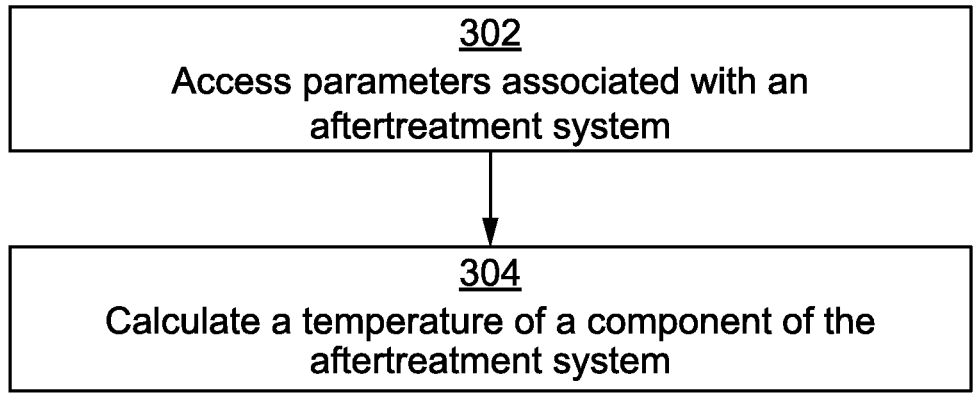
FIG. 3 is a flow diagram depicting calculating a temperature of a component of an aftertreatment system according to an example implementation.
Figure 4:
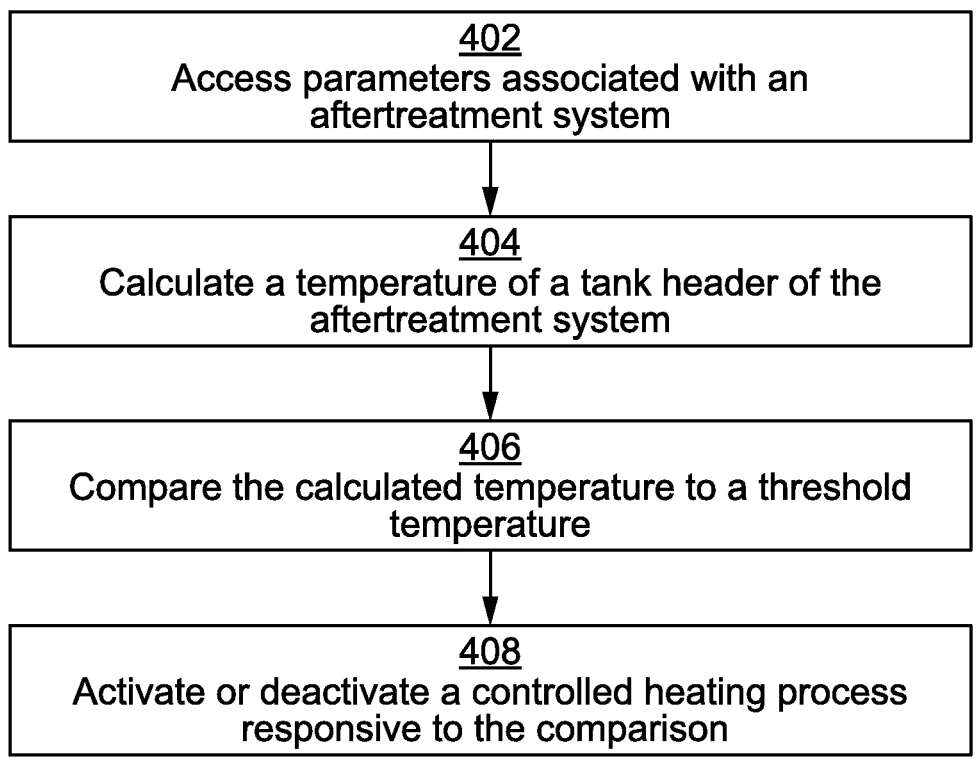
FIG. 4 is a flow diagram depicting activating a controlled heating process for a tank header assembly according to an example implementation.

In certain implementations, the controller 120 is configured to perform certain operations, such as those described herein in relation to FIGS. 3-4. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more modules configured to functionally execute the operations of the controller 120. In certain implementations, the controller 120 may include a heating control circuit and a system switch control circuit for performing the operations described in reference to FIGS. 3-4. The description herein including circuits emphasizes the structural independence of the aspects of the controller 120 and illustrates one grouping of operations and responsibilities of the controller 120. Other groupings that execute similar overall operations are understood within the scope of the present application. Circuits may be implemented in hardware and/or as computer instructions on a non-transient computer readable storage medium, and circuits may be distributed across various hardware or computer based components.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

V. Methods of Heating a Component of an Aftertreatment System

Referring now to FIG. 3, a method or process of calculating a temperature of a component of an aftertreatment system is depicted in a flow diagram according to an example implementation. The method may be executed, for example, by a controller 120. In brief, the method comprises accessing parameters associated with the aftertreatment system and calculating a temperature of a component of the aftertreatment system.

Still referring to FIG. 3 and in more detail, parameters associated with an aftertreatment system are accessed at 302. Parameters associated with the aftertreatment system may include readings of temperature sensors (e.g., from temperature sensor 117) coupled to components of the aftertreatment system, ambient air temperature, ambient air velocity, parameters indicative of a reductant flow, and the like. In some implementations, a key switch parameter may be utilized as an enablement condition for the process to occur. That is, if a parameter indicative of a key-on or key switch on event is set to a value of 1, then the process may proceed. If the parameter indicative of a key-on or key switch on event is set to a value of 0 or a non-1 value, then the process ends or is not performed.

Accessing parameters indicative of readings of temperature sensors coupled to components of the aftertreatment system, ambient air temperature, ambient air velocity, parameters indicative of a reductant flow, and the like may include accessing a parameter value from a memory and/or other storage device, receiving a value from a sensor for the corresponding parameter, etc.

A temperature of a component of an aftertreatment system is calculated at 304. In some implementation, the component of the aftertreatment system is a tank header 114. In some implementations, calculating the temperature of the tank header 114 includes receiving sensor readings from a temperature sensor 117 coupled to the tank header 114. In some implementations, calculating a temperature utilizes the readings of temperature sensors coupled to other components of the aftertreatment system, ambient air temperature, ambient air velocity, parameters indicative of air flow, and the like to determine a temperature or estimated temperature of the tank header 114. A temperature sensor 117 may be coupled to one or more components of the tank header 114. In some implementations, a temperature sensor 117 may not be coupled to the tank header 114 but to one or more components of the aftertreatment system that are coupled to the tank header 114, and a temperature reading of the tank header 114 can be calculated or estimated from these other one or more temperature sensors to determine an estimated temperature of the tank header 114. In some implementations, a thermal model may be used to estimate a temperature of a component of the aftertreatment system (e.g., a tank header 114) using parameters indicative of reductant flow through the tank header 114. In some implementations, a thermal model may be used to estimate a temperature of a component of the aftertreatment system (e.g., a tank header 114) using parameters indicative of ambient air temperature and/or ambient air velocity.

Referring now to FIG. 4, a method or process of activating a controlled heating process for a tank header 114 is depicted in a flow diagram according to an example implementation. In some implementations, a different component associated with or part of the aftertreatment can be heated using method. The method may be executed, for example, by a controller 120. In brief, the method comprises accessing parameters associated with an aftertreatment system, calculating a temperature of a tank header 114 of the aftertreatment system, comparing the calculated temperature to a threshold temperature, and activating or deactivating a controlled heating process responsive to the comparison.

Still referring to FIG. 4 and in more detail, parameters associated with an aftertreatment system are accessed at 402. Parameters associated with the aftertreatment system may include readings of temperature sensors coupled to components of the aftertreatment system, ambient air temperature, ambient air velocity, parameters indicative of a reductant flow, and the like. In some implementations, a key switch parameter may be utilized as an enablement condition for the process to occur. That is, if a parameter indicative of a key-on or key switch on event is set to a value of 1, then the process may proceed. If the parameter indicative of a key-on or key switch on event is set to a value of 0 or a non-1 value, then the process ends or is not performed.

Accessing parameters indicative of readings of temperature sensors coupled to components of the aftertreatment system, ambient air temperature, ambient air velocity, parameters indicative of a reductant flow, and the like may include accessing a parameter value from a memory and/or other storage device, receiving a value from a sensor for the corresponding parameter, etc.

A temperature of a tank header 114 of an aftertreatment system is calculated at 404. In some implementations, calculating a temperature utilizes temperature readings from a temperature sensor 117 coupled to the tank header 114, the readings of other temperature sensors coupled to components of the aftertreatment system, ambient air temperature, ambient air velocity, parameters indicative of reductant flow, and the like to determine a temperature or estimated temperature of the tank header 114. A temperature sensor 117 may be coupled to one or more components of the tank header 114. In some implementations, a temperature sensor 117 may not be coupled to the tank header 114 but to one or more components of the aftertreatment system that are coupled to the tank header 114, and a temperature reading of the tank header 114 can be calculated or estimated from these other one or more temperature sensors to determine an estimated temperature of the tank header 114. In some implementations, a thermal model may be used to estimate a temperature of a component of the aftertreatment system (e.g., a tank header 114) using parameters indicative of reductant flow through the tank header. In some implementations, a thermal model may be used to estimate a temperature of a component of the aftertreatment system (e.g., a tank header 114) using parameters indicative of ambient air temperature and/or ambient air velocity.

The calculated temperature is compared to a threshold temperature at 406. In some implementations, if the calculated temperature of the tank header 114 and/or other aftertreatment system associated component is below a predetermined threshold value, then a controlled heating process of the component may be implemented. If the temperature of the tank header 114 and/or other aftertreatment system associated component is at and/or above the predetermined threshold value, then the controlled heating process of the component may not be implemented. In some instances, two or more predetermined threshold values may be used based on other parameters associated with the aftertreatment system or of a vehicle associated with the aftertreatment system. A first predetermined threshold value may correspond to an initial transition point and a second predetermined threshold value may correspond to a second transition point and so on.

A controlled heating process is activated or deactivated responsive to the temperature comparison at 408. In some implementations, if the calculated temperature is below the threshold temperature, then a controlled heating process can be activated. The controlled heating process may include activating a heating mechanism 113 of the tank header 114 and/or an external heater to heat the tank header 114. Activating or deactivating the controlled heating process may include modifying a value for a control parameter, such as a 1 for activating the controlled heating process and a 0 for deactivating the controlled heating process. Controlled heating processes may include one or more of using resistive heating coils, microwave energy, inductive heating, chemical reactions, a heat pump to transfer heat from a different part of the system, and the like.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   a tank header configured to couple to a reductant tank;
   a heater positioned proximate to the tank header and configured to heat at least a portion of the tank header; and
   a controller configured to execute a process comprising:
      accessing a parameter indicative of reductant flow through the tank header;
      using a thermal model to estimate a temperature of the tank header using the parameter indicative of reductant flow through the tank header;
      comparing the estimated temperature to a threshold temperature; and
      in response to determining that the estimated temperature is below the threshold temperature, activating the heater to heat the at least the portion of the tank header.

2. The system of claim 1, further comprising:
   the reductant tank,
   wherein the tank header comprises:
      a conduit configured to pass reductant from the reductant tank, and
      a junction configured to receive reductant from the reductant tank.

3. The system of claim 1, further comprising a sensor thermally coupled to the tank header.

4. The system of claim 1, wherein the heater is a resistive heating coil.

5. The system of claim 1, wherein the controller is further configured to execute a process that comprises:
   after activating the heater, in response to determining that the estimated temperature is below the threshold temperature, deactivating the heater.

6. A method for controlled heating of a tank header, the method comprising:
   providing a system comprising:
      the tank header, which is configured to couple to a reductant tank,
      a heater positioned proximate to the tank header and configured to heat at least a portion of the tank header, and
      a controller;
   with the controller, accessing a parameter indicative of reductant flow through the tank header;
   with the controller, using a thermal model to estimate a temperature of the tank header using the parameter indicative of reductant flow through the tank header;
   with the controller, comparing the estimated temperature to a threshold temperature;
   with the controller, in response to determining that the estimated temperature is below the threshold temperature, activating the heater to heat the at least the portion of the tank header.

7. The method of claim 6, further comprising:
   with the controller, after activating the heater, in response to determining that the estimated temperature is below the threshold temperature, deactivating the heater.

8. The method of claim 6, wherein the heater is a resistive heating coil.

9. The method of claim 6, wherein the heater is an inductive heating coil that is coupled to a metal plate of the tank header.

10. The method of claim 6, wherein the heater is a heat pump configured to transfer heat to the tank header from another component of the system.

11. The system of claim 1, wherein the heater is an inductive heating coil that is coupled to a metal plate of the tank header.

12. The system of claim 1, wherein the heater is a heat pump configured to transfer heat to the tank header from another component of the system.

13. The system of claim 1, further comprising:
   the reductant tank; and
   an additional heater configured to heat the reductant tank.

14. The method of claim 6, wherein the system further comprises:
   the reductant tank; and
   an additional heater configured to heat the reductant tank.

15. A system comprising:
   a tank header configured to couple to a reductant tank;
   a heater positioned proximate to the tank header and configured to heat at least a portion of the tank header; and
   a controller configured to execute a process comprising:
      accessing a parameter indicative of ambient air temperature or ambient air velocity;
      using a thermal model to estimate a temperature of the tank header using the parameter indicative of ambient air temperature or ambient air velocity;
      comparing the estimated temperature to a threshold temperature; and
      in response to determining that the estimated temperature is below the threshold temperature, activating the heater to heat the at least the portion of the tank header.

16. The system of claim 15, further comprising:
   the reductant tank, wherein the tank header comprises:
a conduit configured to pass reductant from the reductant tank, and
a junction configured to receive reductant from the reductant tank.

17. The system of claim 15, further comprising a sensor thermally coupled to the tank header.

18. The system of claim 15, wherein the heater is a resistive heating coil.

19. The system of claim 15, wherein the controller is further configured to execute a process that comprises:
after activating the heater, in response to determining that the estimated temperature is below the threshold temperature, deactivating the heater.

20. The system of claim 15, wherein the heater is an inductive heating coil that is coupled to a metal plate of the tank header.

21. The system of claim 15, wherein the heater is a heat pump configured to transfer heat to the tank header from another component of the system.

22. The system of claim 15, further comprising:
the reductant tank; and
an additional heater configured to heat the reductant tank.

23. A method for controlled heating of a tank header, the method comprising:
providing a system comprising:
the tank header, which is configured to couple to a reductant tank,
a heater positioned proximate to the tank header and configured to heat at least a portion of the tank header, and
a controller;
with the controller, accessing a parameter indicative of ambient air temperature or ambient air velocity;
with the controller, using a thermal model to estimate a temperature of the tank header using the parameter indicative of ambient air temperature or ambient air velocity;
with the controller, comparing the estimated temperature to a threshold temperature;
with the controller, in response to determining that the estimated temperature is below the threshold temperature, activating the heater to heat the at least the portion of the tank header.

24. The method of claim 23, further comprising:
with the controller, after activating the heater, in response to determining that the estimated temperature is below the threshold temperature, deactivating the heater.

25. The method of claim 23, wherein the heater is a resistive heating coil.

26. The method of claim 23, wherein the heater is an inductive heating coil that is coupled to a metal plate of the tank header.

27. The method of claim 23, wherein the heater is a heat pump configured to transfer heat to the tank header from another component of the system.

28. The method of claim 23, wherein the system further comprises:
the reductant tank; and
an additional heater configured to heat the reductant tank.

* * * * *